UNITED STATES PATENT OFFICE.

JOHN JANITSCHEK, OF MOUNT VERNON, NEW YORK.

MOLD FOR CASTING METALS.

No. 821,718.　　　Specification of Letters Patent.　　　Patented May 29, 1906.

Application filed December 7, 1905. Serial No. 290,830.

*To all whom it may concern:*

Be it known that I, JOHN JANITSCHEK, a citizen of the United States, residing in Mount Vernon, in the county of Westchester, in the State of New York, have invented a certain new and useful Improvement in Molds for Casting Metals, of which the following is a specification.

The improvement will apply to the casting of copper, bronze, brass, and alloys of copper of whatever name, also to gold, silver, German silver, aluminium, and the whole line of metals which fuse at a lower temperature.

This improvement will insure a perfect casting to its utmost details of the finest hand-wrought pattern in metal, clay, wax, or rubber and is especially adapted for making castings from hollow wax patterns known in the art of molding as "lost wax-molding."

I have discovered that slag, the impure glass produced in the manufacture of iron by the union of the lime, used as a flux with the silica in the ore is just sufficiently fusible and strong when mixed in right proportions with more refractory materials to present favorable conditions for fine molding. I obtain the vitreous element in the finely-divided state required by crushing slag-wool, a well-known fiber produced by blowing away a jet of melted slag by a current of high steam.

Calcined plaster, with water, has been long used as a material for molds for metals with some success; but there are objections. I have found coarsely-ground slag-wool and the earthy matter remaining in the form of ashes after the combustion of anthracite and the finely-powdered carbonate of lime, familiarly known as "whiting," mingled therewith and applied with water and alum in a creamy condition far superior to any molding material before generally known and requires but little skill or labor to be properly applied.

I may not be correct in the theory; but I believe that the free sulfuric acid in the alum is ready to supply any small deficiency of acid and the ashes and whiting to supply any deficiency of alkali in the mass. The whole produces a just sufficiently firm, strong, and porous mold.

I can use the ordinary construction of flasks and ordinary patterns and can produce castings of various qualities for various purposes. The invention is more particularly valuable for operating with metal which fuses at moderate temperatures, producing therefrom castings having finely-elaborated surfaces. I will describe it as applied to the production of bronze placques. The faces are unusually smooth and the decorations reproduced with great fidelity.

With this invention I can produce castings of the smallest, as well as of considerable large sizes, without any failure in the details of the work.

The following is a description of what I consider the best means of carrying out the invention:

Mingle intimately three parts of calcined plaster—the ordinary plaster-of-paris—two parts of anthracite ashes, one part whiting, and one part slag-wool. The latter should be broken, but not reduced to a flour. The materials should be mingled dry. To insure uniformity, the whole may be passed several times through agitated screens. Dissolve alum in water, using about a quarter of an ounce of alum to a gallon of water. Inferior alum having much free acid will serve. I provide a soft roller mounted in a handle, so that it can be easily manipulated. It may have a surface of chamois leather underlaid by felt set on a body of wood. The pattern being previously dry, should be thinly but uniformly oiled. The oil is applied very thoroughly in the recesses by beating many times with a moderately stiff brush after the oil is applied. The pattern and the several appurtenances being prepared, I stir in the powdered material. The mixture of solid materials should be so proportioned to the water that the semifluid shall have about the consistency of cream. There is a disposition in the material to form soft lumps, dry in the center. It is important to break all such and to proceed actively, so as to have the material closely packed in place on the surface of the pattern before the setting has proceeded far. I pour it over the pattern to a moderate depth and introduce the soft roller and move it many times in different directions over the entire pattern, particularly repeating the application of the roller over the parts which are finely executed and where bubbles are liable to be produced. The perfect filling of fine depressions in the pattern, and especially the avoidance of bubbles, is promoted by this. The rolling tends both to suck out the air and force in the molding material in all the recesses in the pattern, however deep and abrupt. Before the material has much thickened by setting I add more of the same or a stiffer mixture and fill the mold, striking off any surplus. After a sufficient time for the mold to be well set I invert the whole and take off the moldboard, and applying the other half of the flask, the operation is repeated on this second half of the pattern. In due time when the second part of the mold has also become set the operations of opening the mold and the removing of the pattern may be commenced. This must be conducted slowly, the opening being commenced on one side and allowed to extend across. This can be effected by the use of wedges, commencing on one side. It is essential that the flask be at first opened to a very small extent and the air allowed to enter before it is lifted rapidly. This method makes a very porous, hard, and strong mold.

Modifications may be made without departing from the principle or sacrificing the advantages of the invention. Wood ashes may be substituted for the anthracite ashes named, but anthracite is preferred where procurable. Additions may be made. The quantity of alum may be increased or diminished.

Parts of the invention may be used without the whole. Where one side alone of the article to be molded is fine, the other side may be molded by ordinary processes and ordinary material. In casting from patterns which do not present fine cavities or projections the operating of the roller may be omitted. For molding small articles what are usually termed "snap-flasks" may be used.

I claim as my invention—

1. A mold for casting metals comprising three parts of plaster-of-paris, two parts of ashes, one part of whiting and one part of coarsely-ground slag-wool, with water, substantially as herein specified.

2. A mold for casting metals comprising plaster-of-paris, coarsely-ground slag-wool, ashes and water in about the proportions designated, the inner face being compacted upon a suitable pattern with a thin uniform coating of oil interposed, all substantially as herein specified.

3. A mold for casting metals composed of plaster-of-paris, slag-wool, whiting, ashes, alum, and water, combined in substantially the proportions and having porosity hardness and strength, as herein set forth.

Signed at New York city, in the county of New York and State of New York, this 27th day of November, A. D. 1905.

JOHN JANITSCHEK.

Witnesses:
 THOMAS DREW STETSON,
 E. RASMUSSEN.